(12) United States Patent
Brady et al.

(10) Patent No.: US 8,725,824 B2
(45) Date of Patent: *May 13, 2014

(54) MESSAGE PROCESSING IN A MESSAGING SERVICE CLIENT DEVICE

(71) Applicant: International Business Machines Corporation, Armonk, NY (US)

(72) Inventors: James Colin Brady, Southhampton (GB); Fiona M. Crowther, Winchester (GB); Lucas W. Partridge, SouthHampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,890

(22) Filed: Dec. 19, 2012

(65) Prior Publication Data

US 2013/0110955 A1    May 2, 2013

Related U.S. Application Data

(62) Division of application No. 12/481,795, filed on Jun. 10, 2009, now Pat. No. 8,364,767.

(30) Foreign Application Priority Data

Jun. 11, 2008   (EP) .................................. 08157997

(51) Int. Cl.
*G06F 15/16*   (2006.01)

(52) U.S. Cl.
USPC ............................ 709/206; 709/204; 709/205

(58) Field of Classification Search
USPC .......................................................... 709/206
See application file for complete search history.

(56) References Cited

U.S. PATENT DOCUMENTS

| | | | |
|---|---|---|---|
| 6,539,421 B1* | 3/2003 | Appelman et al. | 709/206 |
| 7,543,243 B2* | 6/2009 | Schwartz et al. | 715/811 |
| 7,853,656 B2* | 12/2010 | Yach et al. | 709/206 |
| 2004/0225541 A1* | 11/2004 | Porter et al. | 705/7 |
| 2006/0075039 A1* | 4/2006 | Narayanaswami et al. | 709/206 |
| 2006/0075228 A1* | 4/2006 | Black et al. | 713/167 |
| 2006/0195795 A1* | 8/2006 | Gale et al. | 715/769 |

* cited by examiner

*Primary Examiner* — Douglas Blair
*Assistant Examiner* — Angela Nguyen
(74) *Attorney, Agent, or Firm* — Steven L. Nichols; Van Cott, Bagley, Cornwall & McCarthy P.C.

(57) ABSTRACT

A method of processing a message in a messaging service client device that has a user interface device includes with the messaging service client device, ascertaining a proposed recipient for a message entered by a user with the user interface device; determining a set of potential recipients for the message with the messaging service client device, the set of potential recipients including the proposed recipient; determining whether, among the set of potential recipients, the proposed recipient is a most likely recipient of the message; and responsive to a determination that the proposed recipient is not the most likely recipient, providing a notification to the user through the user interface device that the proposed recipient is not the most likely recipient.

13 Claims, 6 Drawing Sheets

MESSAGE PROCESSING IN A MESSAGING SERVICE CLIENT DEVICE

RELATED APPLICATIONS

The present application is a divisional of and claimed priority under 35 U.S.C. §120 to U.S. application Ser. No. 12/481,795, filed Jun. 10, 2009, entitled "MESSAGE PROCESSING IN A MESSAGING SERVICE CLIENT DEVICE," which claims priority pursuant to 35 U.S.C. §119 (a) from European Patent Application No. 08157997.1 filed Jun. 11, 2008. Both applications are incorporated herein by reference in their entirety.

BACKGROUND

The present specification pertains to the field of message delivery using a messaging service client device.

The increased pace of electronic communication is such that it is common in many business and personal situations for an individual to be conducting multiple conversations at the same time. In particular, when using synchronous communication such as instant messaging, if the individual is busy he or she may have several instant messaging conversations proceeding simultaneously. Users typically configure their instant messaging clients so that when a new incoming message arrives, the current window focus switches automatically to the corresponding instant messaging window. Often the user does not notice this change in focus and enters text meant for someone else into the inappropriate window. This confusion is especially likely for non-touch typists who are less likely to be looking at the screen.

The consequences are at best an annoyance, in which case the user has to apologize to the unintended recipient and/or explain to the unintended recipient that the message was meant for a different recipient. Often a user also ends up re-entering or copying and pasting his or her message into the window of the intended recipient. All the while that this is happening, the possibility remains that yet another window will appear and change the focus. At worst the user could send embarrassing or confidential information (for example a password or an industrial secret) to the wrong person.

Users of messaging services can sometimes disable the focus-grabbing feature of their instant messaging software, but doing so may mean that they have to receive some visual or audible notification that a new message has arrived from someone else and then manually select the appropriate instant messaging window to respond. Many users would prefer to retain the focus-grabbing feature of their instant messaging software while reducing or eliminating the risk of unintentionally transmitting a message to the wrong recipient.

BRIEF SUMMARY

A method of processing a message in a messaging service client device that has a user interface device includes with the messaging service client device, ascertaining a proposed recipient for a message entered by a user with the user interface device; determining a set of potential recipients for the message with the messaging service client device, the set of potential recipients including the proposed recipient; determining whether, among the set of potential recipients, the proposed recipient is a most likely recipient of the message; and responsive to a determination that the proposed recipient is not the most likely recipient, providing a notification to the user through the user interface device that the proposed recipient is not the most likely recipient.

A messaging service client device includes a user interface device and a processor communicatively coupled to the user interface device. The processor is configured to: ascertain a proposed recipient for a message entered by a user with the user interface device; determine a set of potential recipients for the message, the set of potential recipients including the proposed recipient; analyze the set of potential recipients to determine if the proposed recipient is a most likely recipient of the message; and responsive to a determination that the proposed recipient is not the most likely recipient of the message, provide a notification to the user through the user interface device that the proposed recipient is not the most likely recipient.

A computer program product for processing a message includes a computer readable storage medium having computer readable program code embodied therewith. The computer readable program code includes: computer readable program code configured to ascertain a proposed recipient for a message entered by a user with a user interface device; computer readable program code configured to determine a set of potential recipients for the message, the set of potential recipients including the proposed recipient; computer readable program code configured to determine whether, among the set of potential recipients, the proposed recipient is a most likely recipient of the message; and computer readable program code configured to, responsive to a determination that the proposed recipient is not the most likely recipient, provide a notification to the user through the user interface device that the proposed recipient is not the most likely recipient.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
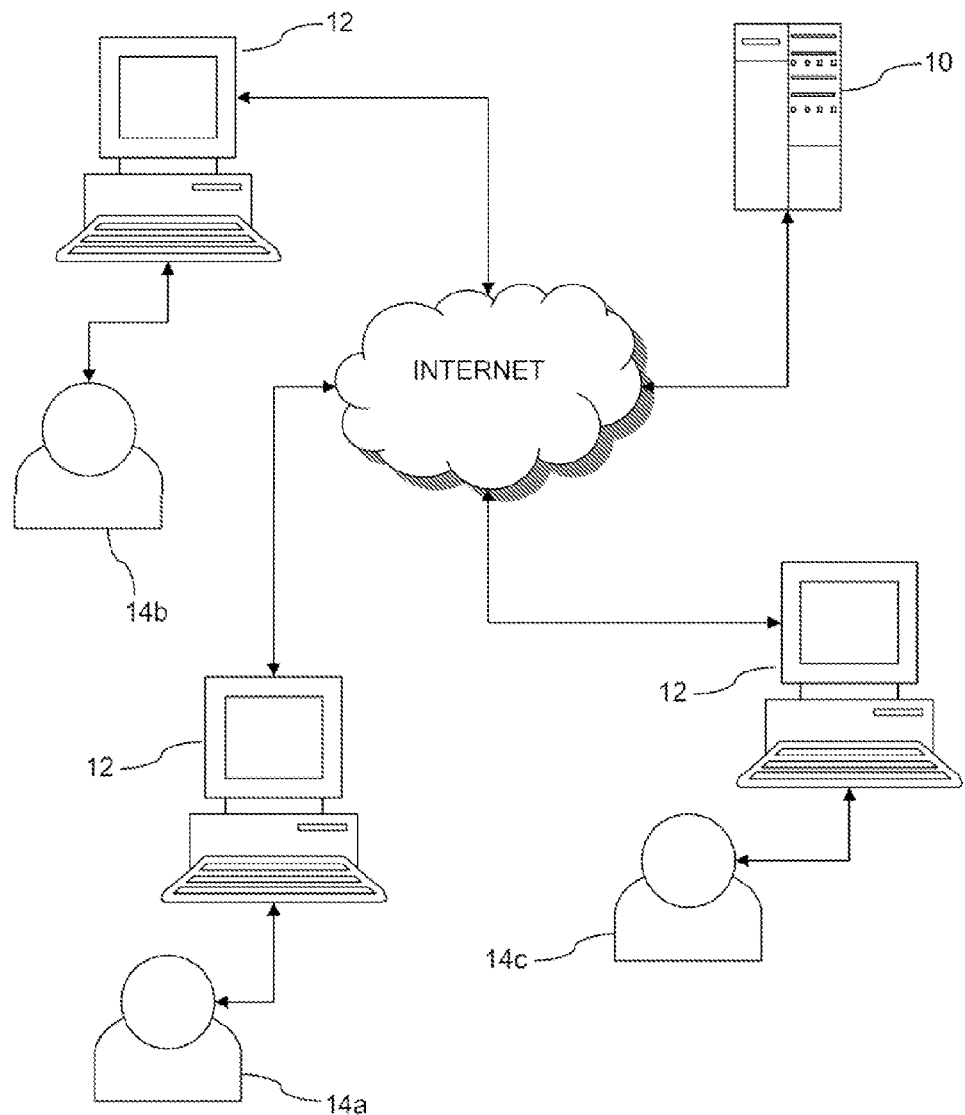
FIG. 1 is a schematic diagram of an illustrative messaging system, according to one exemplary embodiment of the principles described herein.

The present specification discloses methods, systems, and computer program products for processing a message in a messaging service client device such that the focus-grabbing feature of instant messaging software may be retained while reducing or eliminating the risk of unintentionally transmitted messages to a mistaken recipient.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

An example of a system using communication via messages is shown in FIG. 1. The embodiment that is described with reference to this Figure is an instant messaging system. The system comprises a server 10 and client devices 12. The server 10 is running an instant messaging application, and each of the client devices 12 is running a client program that communicates with the instant messaging application that is being maintained by the server 10. In this example, only three client devices 12 are shown for clarity purposes. However, multiple client devices 12 can be connected to the server 10, and indeed multiple servers 10 can be used, with the function of the instant messaging application being distributed across the multiple servers 10.

Each client device 12 is associated with a user 14, who accesses the client program that is being run by their respective client device 12. The user 14 will log into the client program using a username and password, and the client program will notify the application that is being run by the server 10, that the specific user 14 is now available for instant messaging. When two users 14 wish to communicate via instant messaging, then one of the users 14 must initiate a session with the other user 14, normally in a well defined manner.

The server 10 maintains all of the sessions that are taking place between any of the users 14. Whenever a user 14 types a message at their respective client device 12, then that message is sent from their client program to the instant messaging application at the server 10. The server 10 then transmits this message to the other client device 12 participating in the specific session. If there are multiple users 14 in the session then the server 10 will transmit that message to the multiple client devices 12 associated with those users 14.

In the example shown in FIG. 1, user 14a is currently participating in two instant messaging conversations at the same time. User 14a has a one-to-one session running with user 14b, and at the same time also has a one-to-one session running with user 14c. These sessions are managed independently of each other by the server 10, and the two users 14b and 14*c* are each unaware of the existence of the other session. User 14*a* is constantly sending and receiving messages on both communication threads.

Figure 2:
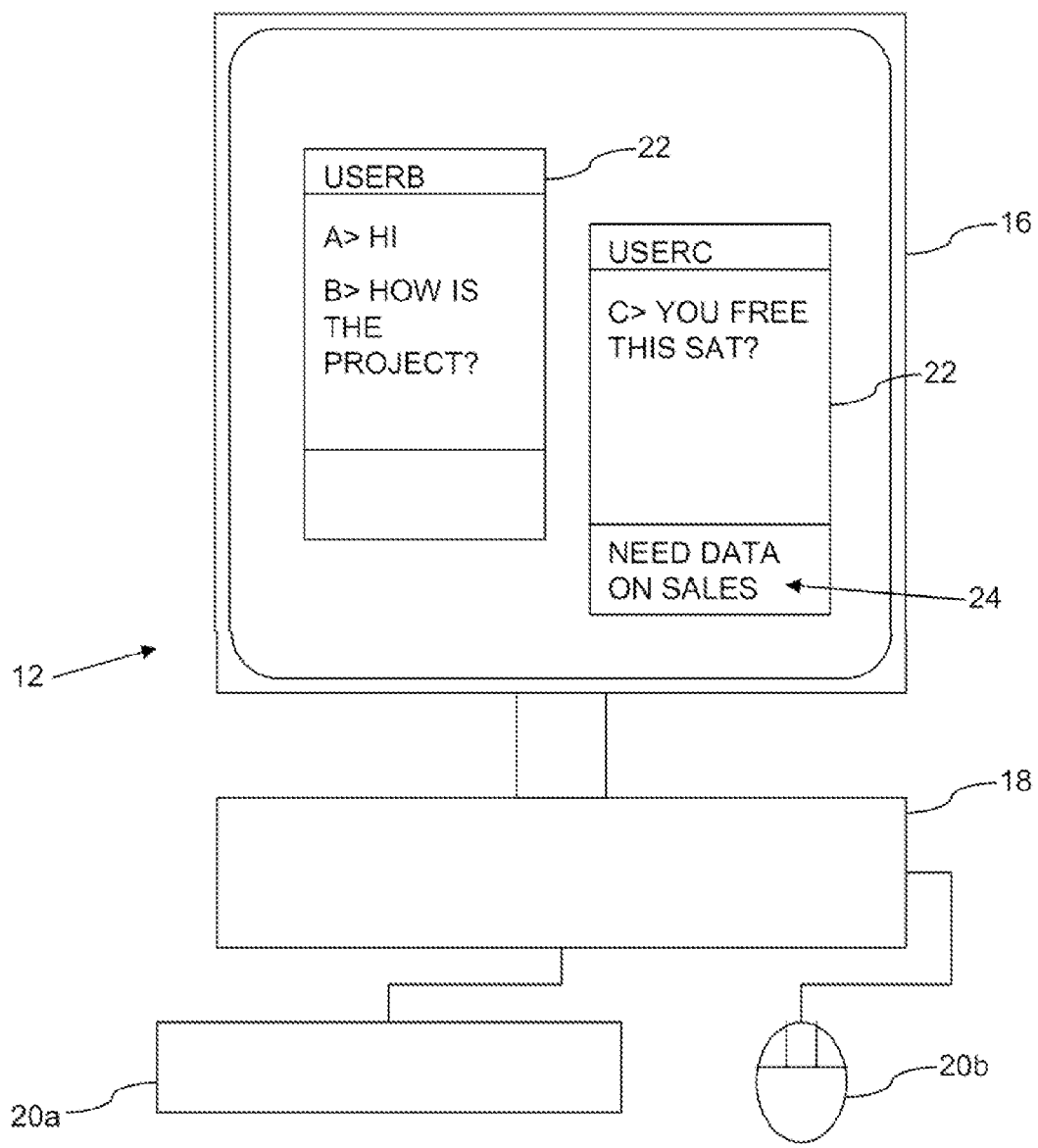
FIG. 2 is a schematic diagram of an illustrative client device for a messaging system, according to one exemplary embodiment of the principles described herein.

The client device 12 of user 14*a* is shown in more detail in FIG. 2. In this Figure, the client device 12 is shown as a conventional desktop computer comprising a display device 16, a processor 18 and user input devices 20, being a keyboard 20*a* and a mouse 20*b*. Together, the display device 16 and user input devices 20 may be referred to as a user interface device. The client device 12 is connected to a wide area network, such as the Internet, via a suitable network standard. Other configurations of client devices 12 are possible, for example, the client device 12 could be a portable computer using a wireless connection for communication, or could be a mobile telephone that has the suitable processing power and interface functionality.

The user 14*a*, as mentioned above, is participating in two instant messaging sessions with the two users 14*b* and 14*c*. Each session is shown independently to the user 14*a*, via graphical user interface windows 22 to the client program that forms part of the instant messaging system. At the top of each window is the name of the user 14 with whom the conversation is currently being held, with the current conversation shown below this, and a sub-window at the bottom for the user 14*a* to enter a new message to send to the relevant user on the respective communication thread. Each respective user 14*b* and 14*c* will see a similar window 22 at their client device 12 corresponding to the current thread.

As can be seen in the display device 16, the communication with user 14*b* was initiated by the user 14*a*, with the message "HI". User 14*b* has responded to this message with their own message "HOW IS THE PROJECT?". The window 22 reflects this current communication thread. However, the instant messaging conversation with user 14*c* was initiated by that user, with the message "YOU FREE THIS SAT?", as can be seen in the window 22 that details this communication thread. It can be imagined that user 14*b* is user 14*a*'s superior, while user 14*c* is a friend of the user 14*a*, who works for a different organization. The user 14*a* is typing a message 24 "NEED DATA ON SALES" into the window 22 that relates to user 14*c*, when this should be the reply to the user 14*b*'s question about the project. This could have occurred, if the focus switching function of the instant messaging client grabbed the cursor over to the window 22 showing the communication with user 14*c*. In this situation the user is in danger of sending the message 24 to the wrong recipient.

The client device 12 of FIGS. 1 and 2 is however arranged to determine whether the message 24 is being sent to the correct recipient. The client device 12 applies techniques to determine whether the reply 24 (or even an initial message) to someone in a messaging conversation is likely to be sent to the most appropriate person. The client device 12, in one embodiment, would analyze the text of the user's reply 24 when or before they press Enter to send the message 24. If the client device 12 determines that the message 24 is more appropriate for one of the other messaging conversations on the client device 12, then it would ask the user 14 if the message 24 should be moved to another window 22 instead. This way the user 14 can keep the focus-grabbing feature enabled but have less fear of sending their reply 24 to an unintended recipient.

A simple embodiment of this processing would work as follows. The processor 18 would implement a 'context evaluator' to evaluate the context of the user's entered text 24 whilst they are entering the message 24, or when they press Enter, to send the message 24. Once the user 14 has pressed Enter, the context evaluator calculates a weighting to determine which of the current messaging conversations (or conversations that have occurred within the last t minutes) is most likely to be applicable. If the weighting is greatest for a window 22 that is different from the one in which the text 24 was entered the user 14 is prompted if they would like to move the text 24 to the other window 22 instead.

For example, the user could be presented with a warning "It looks like you meant to send this to <Bob> instead. Would you like me to move the text there? Yes/No/Move somewhere else". If the user 14 hits "Yes", then the text 24 is moved to Bob's window 22 instead and sent. If the user hits "No", then the text 24 is sent from the current window 22. If the user 14 selects "Move somewhere else" then they are given a choice of other recipients to whom the message 24 could be sent, perhaps ordered by likelihood of being the desired recipient.

A simple embodiment, run by the processor 18, would confine the scope of the context evaluation to the sum text of the current messaging conversations. More advanced embodiments would broaden the scope to include saved chat transcripts between the same parties as well as emails or documents on the user's computer. Any semantic analysis could be extremely simple: even simple word matching or it could use advanced semantic analysis techniques.

The processor 18 could be tuned to be especially sensitive to certain keywords (for example, names of highly confidential projects; or patterns that matched current password rules). Then the processor 18 would be more likely to prompt the user 14 if the processor 18 identified such information to see if the user 14 really did want to send the message 24. This application of the client device 12 might be especially useful in military/government/intelligence environments to help ensure that data only gets transmitted to the intended recipient.

If the focus of the messaging client has recently switched from one window 22 to another window 22, then more weighting could be assigned to the previous window 22, fading with time spent in the current messaging window 22. Also, the processor 18 can be configured to infer from the frequency of key presses whether a period of typing is likely to be a single message. If a focus switch occurs during such a period, then this can be given special consideration.

Any semantic analysis can use Human Language Technology (HLT), which is the field of computing that tries to understand spoken and/or written human languages. See http://www.researchibm.com/hlt/ for overviews. HLT is almost certainly already applied today by intelligence agencies to mine messaging conversations, blogs, emails, phone conversations, etc for subjects of interest. For example see http://citeseer.ist.psu.edu/resig04framework.html and http://citeseer.ist.psu.edu/542441.html.

Figure 3:
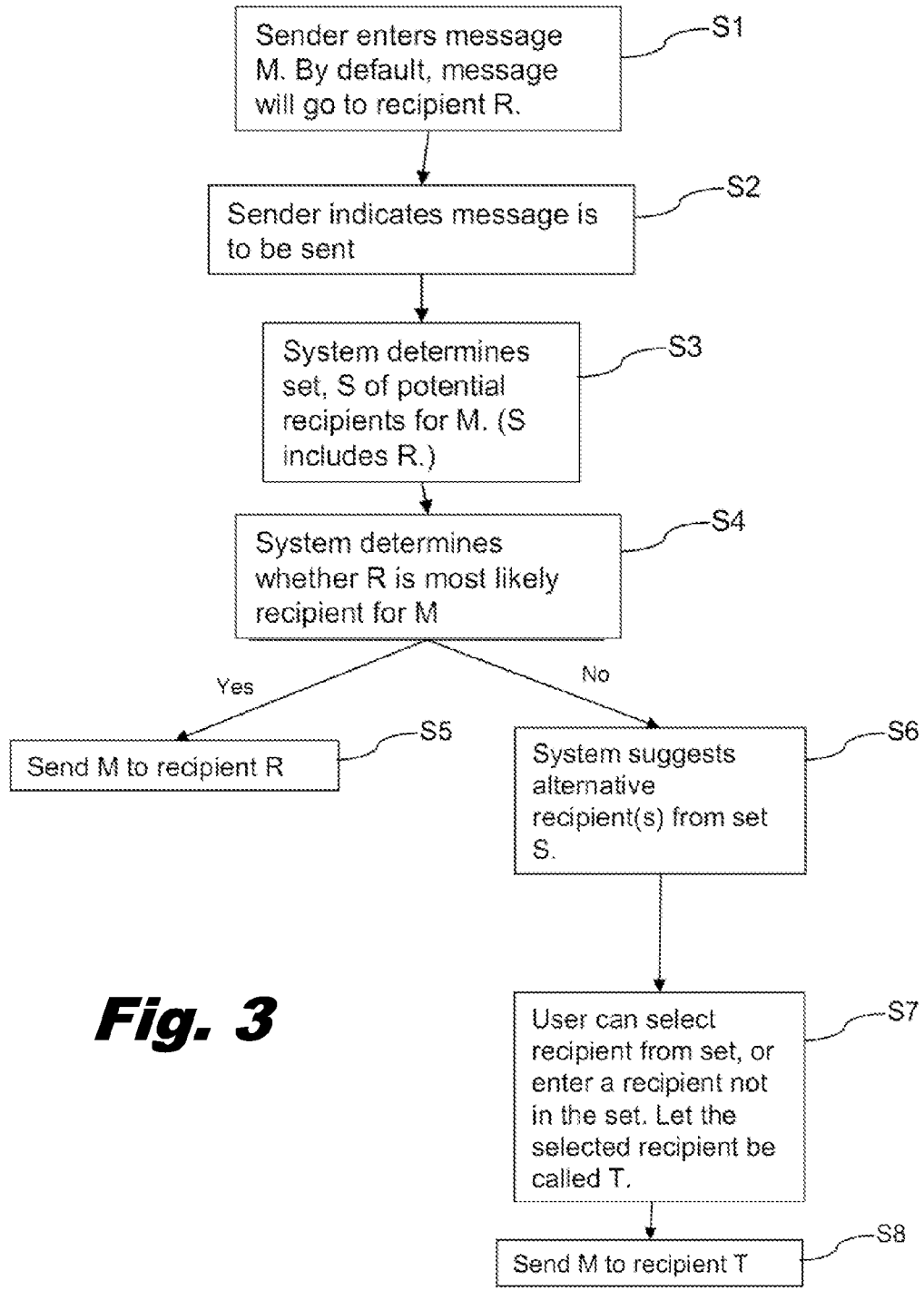
FIG. 3 is a flowchart diagram of an illustrative method of handling a message, according to one exemplary embodiment of the principles described herein.

FIG. 3 gives an example of the methodology carried out by the processor 18 of the client device 12. The first step S1 is the step of receiving the message 24 (either as it is created or after the user 14 has selected "send") and ascertaining a proposed recipient R for the message 24. The proposed recipient may be specified directly by the user 14, or may be inferred by the processor 18. In the latter case, for example in an instant messaging environment, then if the user 14 is entering text in a specific window 22, then the proposed recipient R will be the user 14 who is associated with that respective window 22. At step S2, the user 14 indicates that the message 24 is to be sent to the proposed recipient R.

At step S3, the processor 18 will determine a set S of potential recipients for the message 24, the set S including the proposed recipient R. There are many different ways in which the set S can be created. For example, the processor 18 may simply include those users 14 who are currently in conversation with the user 14 whose client device 12 is running the process. Other more complex configurations are possible. For example, the determining of the set S of potential recipients for the message 24 may comprise ascertaining those potential recipients who have received or transmitted a message in the previous time t, where t is ten minutes for example. This will then include people who have terminated any communication thread recently, and may also include potential recipients across different messaging formats, so may include email and instant messaging users 14.

Following the population of the set S, then at step S4, the processor 18 performs an analysis on the set S of potential recipients to determine if the proposed recipient R is the most likely recipient for the message 24. There are many ways in which this processing can be carried out, and a combination of different techniques can be used to determine which of the potential recipients, in the set S, is the most likely recipient. More detail of this processing is given below with reference to FIG. 5. At step S5, the processor 18 transmits the message 24 to the proposed recipient R if the proposed recipient R is the most likely recipient, and the process terminates.

If the proposed recipient R is not the most likely recipient, then the processor 18 provides a warning to the user 14. The step of providing this warning (if the proposed recipient R is not the most likely recipient) comprises, in this embodiment, presenting an output comprising the determined most likely recipient. The output additionally comprises one or more alternative recipients, and this is shown at step S6. Once the user 14 can see the warning, then they can react to that warning. At step S7, a user input is received selecting a new recipient T from the presented output and, at step S8, the message 24 is transmitted to the new recipient T, and the processing of the message 24 terminates.

Figure 4:
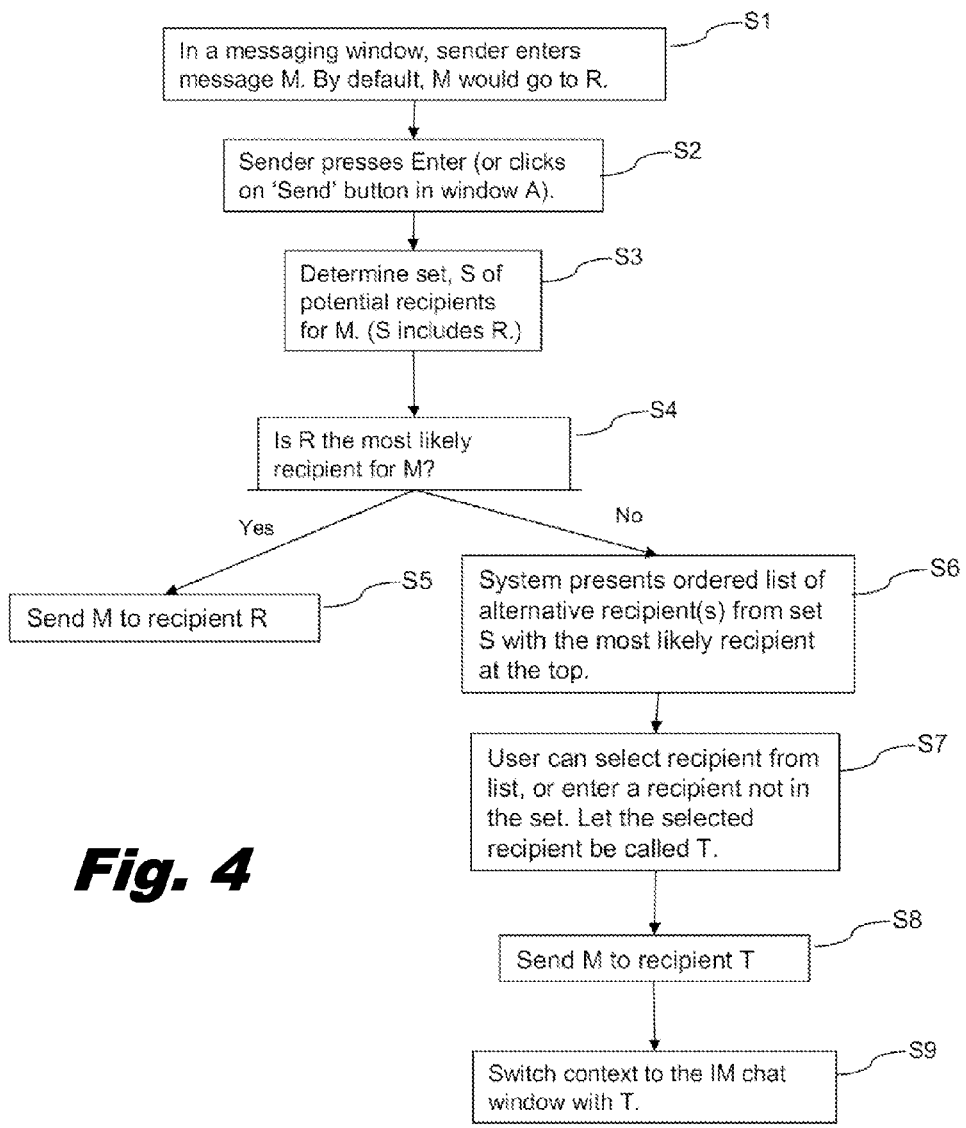
FIG. 4 is a flowchart diagram of an illustrative method of handling a message, according to one exemplary embodiment of the principles described herein.

A more specific embodiment of the process of FIG. 3 is shown in FIG. 4. This Figure shows how the processor 18 will operate in an instant messaging specific embodiment of the invention. The numbering of the steps is maintained in FIG. 4, as used in FIG. 3, to illustrate effectively the same function of the processor 18, as the specific implementation is executed. At step S1, the user 14 enters the message 24 at a window 22 of the messaging client, which implies the default recipient R (the user associated with the window 22 that has the current focus). At step S2, the user 14 presses enter or engages in some other user interface action to indicate that the message 24 should be sent.

As in FIG. 3, the processor 18 at steps S3 and S4 determines a set S of potential recipients and determines if the proposed recipient R is the most likely recipient for the message 24. If the recipient R, the user who is indicated by the currently focused window 22, is the most likely recipient, then at step S5, the message 24 is sent to the named recipient. If not however, then at step S6, the user 14 is presented with an ordered list of possible alternative recipients, from the set S, including R, with the most likely recipient at the top. At step S7, the user makes a choice of a recipient T from the presented list, or enters a new recipient T who is not in the options shown, and, at step S8, the message 24 is sent to this recipient T.

Additionally, at step S9, the processor 18 controls the instant messaging client being run by the local device 12 to switch the current context to the chat window 22 associated with that recipient T. This will cause the message 24 to be moved from the window 22 where it was entered by the user 14 to the new window 22 associated with that recipient T. It is possible that the current set up with the windows 22 displayed to the user 14 is such that there is actually no window 22 currently being displayed that relates to that user T. In this case, the instant messaging client will be configured to open a new window 22 that shows the message 24, and also, if any previous chat transcripts are available, restores any previous conversation between the user 14 and the recipient T.

Figure 5:
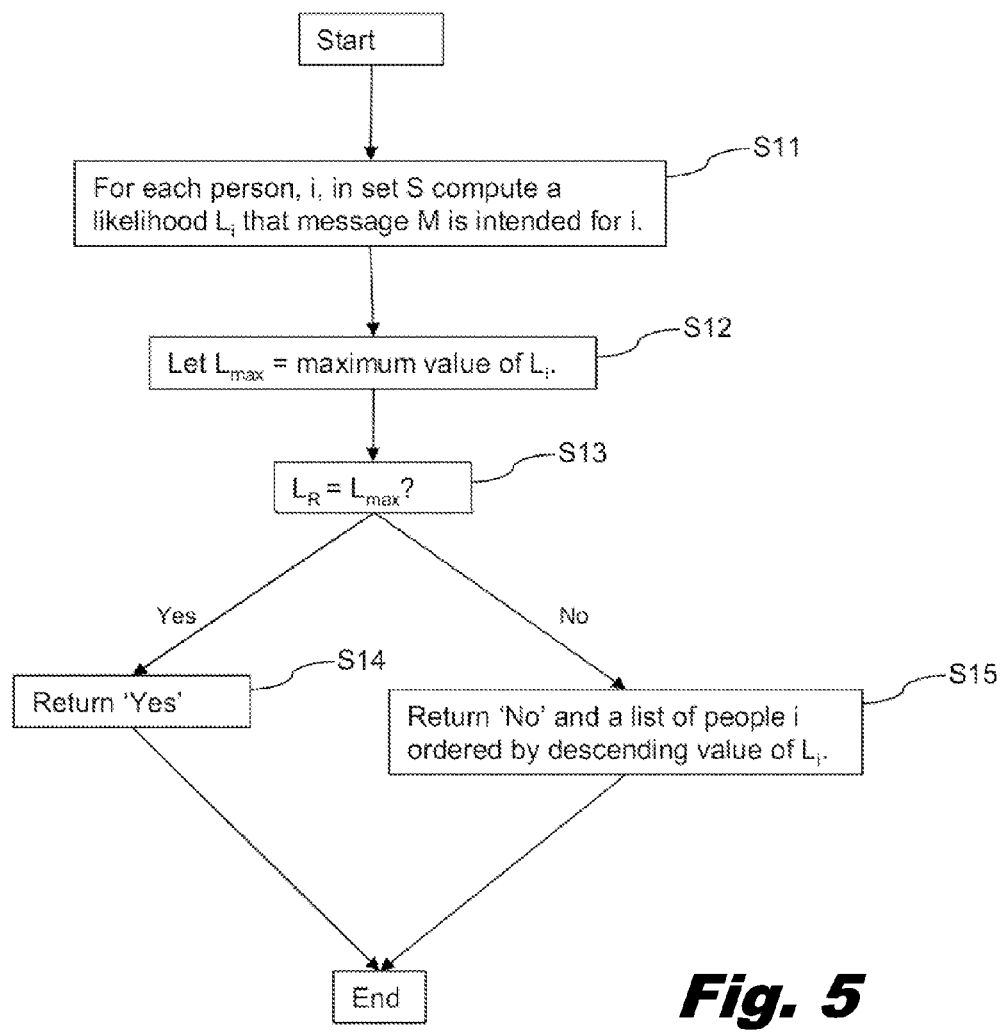
FIG. 5 is a flowchart diagram of an illustrative method of determining the most likely recipient of a message, according to one exemplary embodiment of the principles described herein.

FIG. 5 shows in more detail the computation of the most likely recipient of the message 24. This flowchart can be considered to be an expansion of the step S4 of FIGS. 3 and 4. As an input to the calculation, the processor 18 has the set S, which comprises the potential recipients of the message 24. This set S always includes the proposed recipient R, and in addition or instead of real recipients could include a nominal recipient as a test case to provide a benchmark for the process. The first step in this working is the step S11, whereby a likelihood $L_i$ is calculated for each person i within the set S.

Many different algorithms can be used to compute the likelihood $L_i$. For examples, as mentioned above, it is possible to use HLT (Human Language Technology) to compare the content of the message 24 with the content of the active window 22 (optionally including transcript history with that user 14). Other methods include the use of simple word matching, with the more matches between the message 24 and previous transcript history results in higher $L_i$ value. It is also possible that the processor 18 can be configured to use pattern matching against a pre-defined list of password rules to establish whether passwords are included, and whether they can be sent to the proposed user 14.

Additionally, or alternatively, pattern and/or word matching with pre-defined list of sensitive words and/or phrases can be used. The time since specific windows 22 were last used, with more recent conversations having a higher priority then older conversations, can be used in determining the likelihood $L_i$. Similarly, the previously active window 22 would be the most likely and this can be input into the likelihood $L_i$ calculations. External sources such as emails and documents on the user's computer 12 may also be used to establish likelihood levels. Data such as the frequency of key-presses can also be used to establish whether a prior window 22 may be more likely (with the gap in writing indicating separate messages).

Once the likelihood $L_i$ is worked out for each member of the set S, then at step S12, a variable $L_{max}$ is set to the value of the highest $L_i$. At step S13, a test is applied to see if $L_R=L_{max}$. If this is the case, then the proposed recipient R is the most likely recipient of the message 24, and at step S14, the return of this process is the result "yes", indicating that the message 24 is safe to send to the proposed recipient R. If $L_R<L_{max}$, then the process moves to step S15, and the output of the process is "no", indicating that the message 24 should perhaps not be sent to the recipient R, and there is supplied an ordered list of the population of the set S, showing the most likely recipient ($L_i=L_{max}$) at the top, with the remainder ordered by descending value of $L_i$. It is possible for there to be more than one person, i, whose $L_i=L_{max}$. In this case, however, R is arbitrarily still considered to be the most likely recipient.

Figure 6:
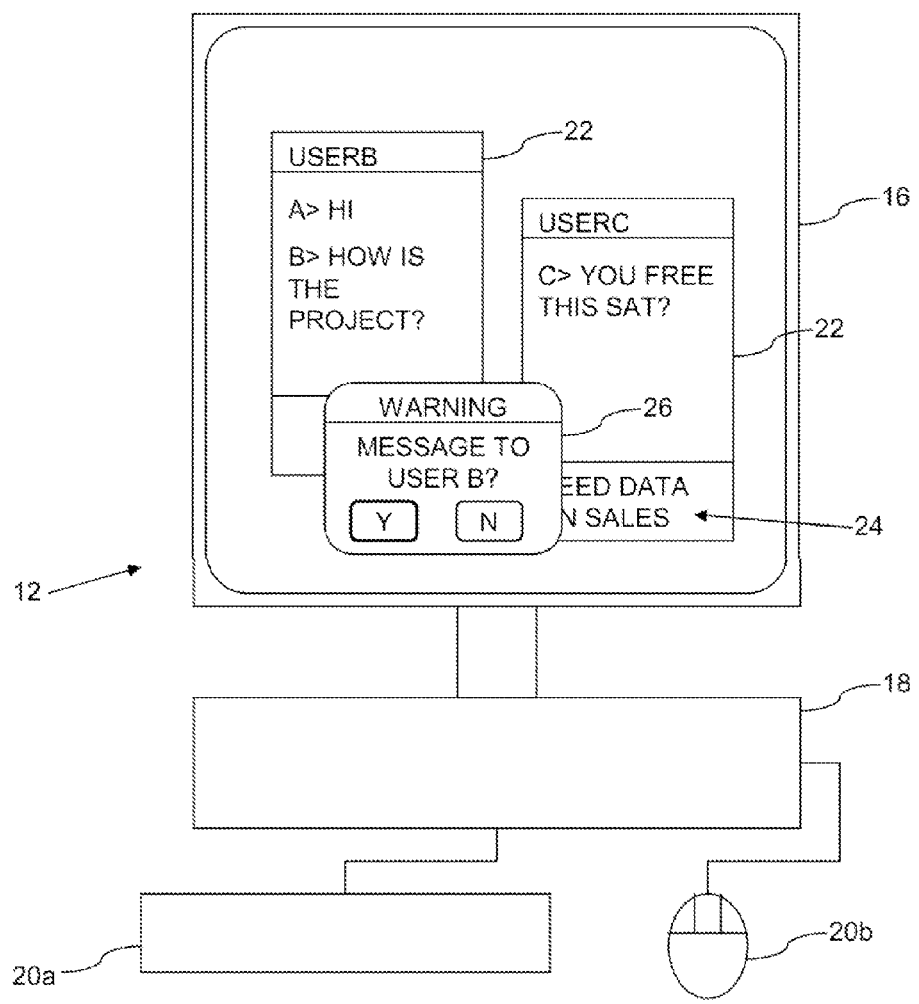
FIG. 6 is a schematic diagram of an illustrative messaging system, according to one exemplary embodiment of the principles described herein.

An example of the output to the user 14, after the processing has been executed by the processor 18, is shown in FIG. 6. This shows the same configuration of client device and messaging clients as shown in FIG. 1. User 14a has typed the message "NEED DATA ON SALES", and pressed return to send that message 24. They have inadvertently typed the message 24 in the window 22 that is associated with the user 14c, which has been caused by the focus grabbing feature of the instant messaging client. Once the user 14a executes the send operation, then the processor 18 has performed the process that is shown in FIG. 4.

The processor 18 has populated a set S with the two users (user 14b and user 14c) on the basis that these two users 14 are the current existing message contacts for the user 14a, as determined from the open windows 22. The proposed recipient (user 14c), to which the user 14a is trying to send the message 24, is present in this set S. The processor 18 has then calculated the likelihood $L_i$ for each of the users 14b and 14c. In this case, the processor 18 has determined that the most likely recipient ($L_{max}$) is not $L_R$, meaning that the most likely recipient is not the proposed recipient. The determination in this case is likely to be based upon the fact that a focus switch occurred just before the user 14a began typing. Alternatively, previous chat transcripts with user 14b might include several occurrences of the words 'project', 'data' and 'sales' (or lexical variations thereof) whereas, by contrast, the stored chat history with user 14c might include no such occurrences. In a more sophisticated embodiment, both the focus switching and the word matching algorithm might be used to determine that user 14c is not the most likely recipient R.

In response to the determination of the fact that the proposed recipient is not the most likely recipient, the processor has provided a warning, which is shown to the user as the output 26. This warning 26 prompts the user 14a to consider that they might be about to send the message 24 to the wrong recipient. The user 14a is asked if they would rather send that message 24 to the user 14b. If the user 14a clicks "yes" or presses Enter, then the message will be sent to the user 14b, and the text of the message 24 will be switched from the window 22 of the conversation with user 14c to the window 22 of the conversation with user 14b. In this a method is provided of handling the message 24 that stops the message 24 being sent to the wrong recipient, without any alteration needed to the normal working of the instant messaging application (for example with reference to focus switching).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of processing a message in a messaging service client device that comprises a user interface device, said method comprising:

with said messaging service client device, ascertaining a proposed recipient for a message entered by a user with said user interface device;

determining a set of potential recipients for the message, said set of potential recipients including the proposed recipient;

calculating a likelihood value for each recipient in said set of potential recipients;

determining, based on the likelihood value for each recipient, whether, among said set of potential recipients, said proposed recipient is a most likely recipient of said message;

responsive to a determination that said proposed recipient is not said most likely recipient, providing a notification to said user through said user interface device that said proposed recipient is not said most likely recipient by presenting said most likely recipient to said user through said user interface device;

receiving a new recipient selection from said user through said user interface device;

responsive to receiving said new recipient selection, automatically switching a current window focus and said message to an instant messaging window associated with said new recipient and restoring previous chat transcripts in said instant messaging window associated with said new recipient; and transmitting said message to said new recipient.

2. The method of claim 1, in which calculating a likelihood value comprises performing analysis on said set of potential recipients by textually analyzing one or more previous messages received from or sent to recipients in said set of potential recipients for word matches with said message.

3. The method of claim 1, wherein determining said set of potential recipients for said message comprises ascertaining potential recipients who are currently in conversation with said user, ascertaining potential recipients who have received a message from said user within a predetermined time interval and ascertaining potential recipients who have transmitted a message to said user within a predetermined time interval.

4. The method of claim 1, further comprising, in response to a new incoming instant message, automatically switching said current window focus from a first instant messaging window to a second instant messaging window containing said new incoming instant message.

5. The method of claim 1, in which determining a set of potential recipients comprises determining potential recipients who are currently in conversation with said user.

6. The method of claim 1, in which said set of potential recipients includes a nominal recipient as a test case to provide a benchmark.

7. The method of claim 1, further comprising using pattern matching to compare text of said message with a pre-defined list of password rules to determine whether passwords are included in said message and comparing text of said message with a pre-defined list of sensitive words and phrases.

8. The method of claim 1, in which determining whether said proposed recipient is a most likely recipient of said message comprises giving a higher priority to more recent conversations than older conversations.

9. The method of claim 1, in which determining whether said proposed recipient is a most likely recipient of said message comprises analyzing a frequency of key-presses to discover gaps in key-presses which indicate separate messages.

10. The method of claim 1, in which said notification comprises an ordered list of possible alternative recipients from said set of potential recipients with said most likely recipient at the top of said ordered list.

11. The method of claim 1, further comprising:
comparing a likelihood value of said proposed recipient with a maximum likelihood value in said set of potential recipients;
in which said determination whether said proposed recipient is said most likely recipient of said message comprises determining that said likelihood value of the proposed recipient is equal to said maximum likelihood value in said set of potential recipients; and
in which said determination that said proposed recipient is not said most likely recipient comprises determining that said likelihood value of said proposed recipient is less than said maximum likelihood value in said set of potential recipients.

12. A computer program product for processing a message, said computer program product comprising:
a computer readable storage memory having computer readable program code embodied therewith, the computer readable program code comprising:
computer readable program code configured to ascertain a proposed recipient for a message entered by a user with a user interface device;
computer readable program code configured to determine a set of potential recipients for said message, said set of potential recipients including said proposed recipient;
computer readable program code configured to determine whether, among said set of potential recipients, the proposed recipient is a most likely recipient of said message by at least one of: determining entities who are currently in conversation with said user, giving a higher priority to more recent conversations than older conversations, and analyzing a frequency of keypresses to discover gaps in key-presses which indicate separate messages;
computer readable program code configured to calculate a likelihood value for each recipient in said set of potential recipients and comparing a likelihood value of said proposed recipient with a maximum likelihood value in said set of potential recipients;
computer readable program code configured to, responsive to a determination that said proposed recipient is said most likely recipient, transmit said message to said proposed recipient;
computer readable program code configured to, responsive to a determination that said proposed recipient is not said most likely recipient, provide a notification to said user through said user interface device that said proposed recipient is not said most likely recipient, said notification comprising an ordered list of possible alternative recipients from said set of potential recipients with the most likely recipient at the top of said ordered list;
computer readable program code configured to receive a selection of a new recipient entered by said user through said user interface device responsive to said notification;
computer readable program code configured to automatically switch a current window focus to an instant messaging window associated with said new recipient and restore previous chat transcripts in said instant messaging window associated with said new recipient; and
computer readable program code configured to transmit said message to said new recipient.

13. The computer program product of claim 12,
in which said determination whether said proposed recipient is said most likely recipient of said message comprises determining that said likelihood value of the proposed recipient is equal to said maximum likelihood value in said set of potential recipients; and
in which said determination that said proposed recipient is not said most likely recipient comprises determining that said likelihood value of said proposed recipient is less than said maximum likelihood value in said set of potential recipients.

* * * * *